United States Patent Office 3,686,236
Patented Aug. 22, 1972

3,686,236
SUBSTITUTED STEROIDS
Sandor Barcza, 1480 Pleasant Valley Way,
West Orange, N.J. 07052
No Drawing. Continuation-in-part of application Ser. No. 2,442, Jan. 12, 1970. This application Oct. 26, 1970, Ser. No. 84,255
Int. Cl. C07c 169/20
U.S. Cl. 260—397.5
10 Claims

ABSTRACT OF THE DISCLOSURE

The compounds are tri(lower)alkyl silylmethylethers of hydroxy-substituted steroids, e.g. 3-trimethylsilylmethyl ether of 17alpha - ethynylestra-1,3,5(10)-triene-3,17beta-diol. Said compounds are useful as estrogenic agents.

---

This is a continuation-in-part of copending application Ser. No. 2,442, filed Jan. 12, 1970.

This invention relates to steroidal compounds, and more particularly to steroids bearing a tri(lower)alkyl silylmethoxy-substituent at least at the 3-position, as well as to the preparation thereof, and intermediates in said preparation. This invention also relates to pharmaceutical compositions containing said substituted steroids and to the use of such compositions.

The final products of this invention may be conveniently represented by the Formula I:

I.
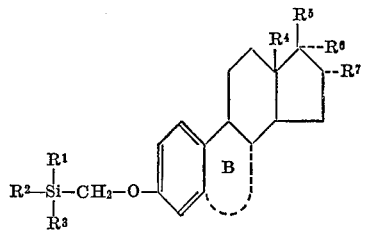

wherein each of $R^1$, $R^2$, and $R^3$ is, independently, lower alkyl; $R^4$ is alkyl having from 1 to 3 carbon atoms, e.g. methyl, ethyl, propyl or isopropyl, preferably being unbranched; each of $R^5$ and $R^7$ is, independently, a hydrogen atom, hydroxy, lower alkanoyloxy, benzoyloxy, tetrahydropyran-2-yloxy, or, any of the functions:

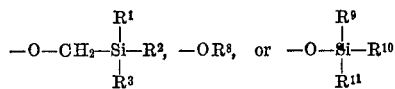

wherein $R^1$, $R^2$ and $R^3$ are as defined above and $R^8$, $R^9$, $R^{10}$ and $R^{11}$ are each, independently, lower alkyl;
$R^6$ is lower alkanoyloxy, benzoyloxy, tetrahydropyran-2-yloxy, hydroxy or, any of the functions:

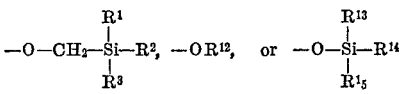

wherein $R^1$, $R^2$ and $R^3$ are as defined above and $R^{12}$, $R^{13}$, $R^{14}$ and and $R^{15}$ are each, independently, lower alkyl,
when $R^5$ is a hydrogen atom; and
when $R^5$ is other than a hydrogen atom, then $R^6$ is lower alkyl, lower alkenyl, e.g., having from 2 to 4 carbon atoms, such as vinyl, allyl or methallyl, lower alkynyl (including halo-lower alkynyl) e.g., having from 2 to 6 carbon atoms such as ethynyl, fluoroethynyl, chloroethynyl, bromoethynyl, propynyl, trifluoro propynyl, butynyl, and hexylyl, propadienyl or 3′-lower alkyl- propadienyl such as buta-1,2-dien-3-yl; a hydrogen atom; or $R^5$ and $R^6$ taken together are oxo, ethylenedioxy or n-propylenedioxy;
and ring B is saturated and contains from 5 to 7 carbon atoms, or is a mono or di-unsaturated cyclic hydrocarbon ring containing 6 carbon atoms, said mono-unsaturation being at either the 6, 7, or 8-positions, and said di-unsaturation being at the 6 and 8 positions; and the compounds may have an 8(14) double bond when ring B has 7 carbon atoms.

In the above-presented definitions, the term lower alkyl includes those groups having from 1 to 4 carbon atoms such as methyl, ethyl, propyl and butyl including isomeric forms where they exist, but those that are unbranched are preferred; the term lower alkanoyl includes acyl groups having from 2 to 4 carbon atoms such as acetyl, propionyl and butyryl, and isomeric forms where they exist, but those that are unbranched are preferred; and the terms lower alkenyl and lower alkynyl includes their various isomers with respect to location of unsaturation and configuration of the carbon atoms.

This invention provides a convenient method of obtaining the above-described Compounds I, namely by reacting (process a) a Compound II, i.e. suitable alkali metal salt of a hydroxy-substituted steroid, i.e. a Compound III, with an appropriate tri(lower)alkyl silyl methyl halide, i.e., a Compound IV:

IV.
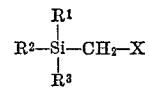

wherein $R^1$, $R^2$ and $R^3$ are as defined above and X is a halogen having an atomic weight of from 34 to 127, i.e., chloro, bromo or iodo, in an inert organic solvent, at a temperature of from about −20° to +100° C., preferably at about 0° to +80° C. Suitable solvents include absolute dimethylacetamide and absolute dimethylformamide. It is preferable to carry out the reaction in the presence of a catalytic amount of an alkali metal halide, e.g. NaI. Preferably moisture is excluded from the reaction, and it is also preferable to carry out the reaction under an inert atmosphere, e.g. nitrogen. Preferably, an excess of the Compound IV is employed, e.g. in from 5 to 100% excess over that theoretically required.

Compounds suitable as Compounds III may be conveniently represented by the structural formula:

III.
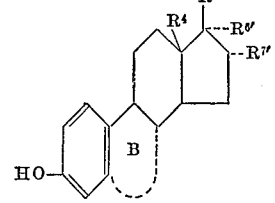

wherein $R^4$ is as defined above, and each of $R^{5'}$, $R^{6'}$ and $R^{7'}$ has the same definition as given above from $R^5$, $R^6$ $R^7$, respectively, except that none of said substituents is a trialkylsilylmethoxy group; and ring B is defined above.

The Compound II may be obtained by treating the corresponding Compound III with a strong alkali metal base (Compound V), such as the alkali metal hydride, amide, t-butoxide or alkylate, e.g., n-butyl-lithium, in a manner conventionally employed for forming an alkali metal alcoholate or phenolate. If desired, the Compound II may be prepared and then reacted with Compound IV (process a), or the Compound III may be mixed with the Compound IV and the reaction (process b) carried out in the presence of a strong base and in the presence of an appropriate solvent for carrying out (process a).

It will be readily appreciated by persons skilled in the art, that under basic reaction conditions acyloxy groups might not be stable; hence, where an acyloxy-substituted Compound I is desired, it is advisable to prepare a corresponding hydroxy-bearing Compound Ia, which then may be acylated by known means to the desired Compound I.

The positions of the above-mentioned alkali metal salts and reactants, include sodium, potassium and lithium; sodium being preferred.

It will be appreciated that the hydroxy groups of the Compound III may be located at the positions, and may be of the types as follows:

| Position: | Type | Present as— |
| --- | --- | --- |
| 3 | Phenolic | HO |
| 16 alpha | Secondary | $R^{7'}$ |
| 17 beta | Secondary or tertiary [1] | $R^{5'}$ |
| 17 alpha | Secondary | $R^{6'}$ |

[1] Is secondary when $R^{6'}$ is H, tertiary when $R^{6'}$ is not H.

The relative degree of activity of the alkali metal alcoholate units on the intermediate Compound II in descending order is phenolic (position-3) > secondary > tertiary It will be appreciated by those skilled in the art that the above described processes (a) or (b) will yield a Compound I bearing at least a 3-trialkylsilylmethoxy substituent, and depending upon the ratio of the equivalents of the reactants and reaction conditions employed, Compounds I having trialkylsilylmethoxy substituents additionally at the 16alpha, and 17alpha or 17beta positions, may also be obtained. Such "additionally substituted" products may alternatively be obtained by step-wise treatment, i.e. by subjecting a 3-trialkylsilylmethoxy-substituted Compound I, to further treatment by process (a) or (b).

Interconversions between Compounds I may be carried out if desired, by conventional means. For example, a Compound I wherein $R^5+R^6$ is oxo may be treated with an organo-metallic reagent such as used in the well-known Grignard-type reactions, to obtain a Compound I wherein $R^5$ is hydroxy and $R^6$ is, e.g. alkyl, alkenyl or alkynyl. Other groups suitable as $R^5$ or $R^6$ are obtainable by general procedures described in the literature.

The technique of masking or protecting a hydroxy function e.g. by conversion to an acyloxy or tetrahydropyran-2-yloxy group and at a subsequent stage converting such group back to a hydroxy group, to obtain a compound having one or more hydroxy functions at selected locations, is well known in the art. Likewise, the technique of protecting a keto-function, e.g. as a ketal which is readily acid-hydrolyzed, such as an ethylenedioxy group, is well known in the art. In carrying out acid hydrolysis reactions, care should be exercised, once any trialkylsilylmethoxy-substituents have been introduced, to avoid strongly acid conditions. For example, acetal or ether protecting groups may be conveniently hydrolyzed by treatment with aqueous acid at pH of 2 to 5, e.g. aqueous acetic or oxalic acid, or dilute mineral acid.

Compounds suitable as reagents and reactants, e.g. as Compounds III, are known and are obtainable by methods described in the literature, or where not known may be obtained by methods analogous to those for obtaining the known compounds.

Compounds I are useful because they possess pharmacological properties in animals. In particular, such compounds are useful in treating estrogen deficiencies and as fertility control agents in mammals as they exhibit estrogenic activity. The estrogenic activity is indicated in the rat as determined by well-known methods, e.g., the method basically described in Am. J. Physiol. 189 (1957) 355.

These compounds may be combined with a pharmaceutically acceptable carrier or adjuvant. They may be administered orally or parenterally. The dosage will vary depending upon the mode of administration utilized and the particular compound employed. However, in general, satisfactory results are obtained when the compounds are administered at a daily dosage of from about 0.2 milligram to 30 milligrams. This daily dosage is preferably given in equally divided doses, e.g., 1 to 2 times a day, or in sustained release form. As these compounds exhibit long-term activity, they may also be administered in single doses intermittently, e.g. at intervals of about 2 to 8 weeks. It will be appreciated by those skilled in the art, that the daily dosage level is independent of body weight. Dosage forms suitable for internal administration comprise from about 0.1 mg. to about 30 mg. of the compound in admixture with a solid or liquid pharmaceutical carrier or diluent.

A representative formulation notable for oral administration is a capsule (250 mg.) prepared by standard techniques which contains the following:

| Ingredient: | Weight (mg.) |
| --- | --- |
| 3 - trimethylsilylmethyl ether of 17alpha-ethynylestra - 1,3,5(10) - triene - 3,17beta-diol | 0.1 |
| Inert solid diluent (starch, lactose or kaolin) | 249.9 |

This invention is illustrated, but not limited by the following examples wherein all temperatures are in centigrade (C.) and room temperature is 20° to 30° C. unless specified otherwise.

EXAMPLE 1

3-trimethylsilylmethyl ether of 17alpha-ethynylestra-1,3,5(10)-triene-3,17beta-diol

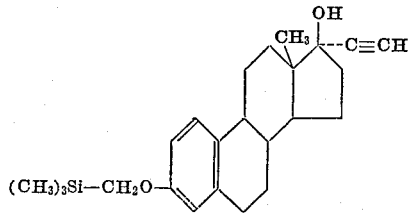

STEP A.—PREPARATION OF 3–TRIMETHYLSILYL-METHYL ETHER OF ESTRONE 0.907 g. (about 18.8 x 1.1 mmoles) of sodium hydride (50%) in mineral oil is washed twice with 4 ml. portions of heptane to remove the mineral oil. The thus-washed sodium hydride is then combined with 0.297 g. (about 18.8 x 0.1 mmoles) of sodium iodide and 5.098 g. (18.8 mmoles) of estrone.

Under nitrogen atmosphere, 8 g. of dimethylacetamide (spectroscopic grade) is added thereto, the resulting mixture cooled to 0°, and 3.5 g. (about 18.8 x 1.5 mmoles) of chloromethyltrimethylsilane then added. The mixture is then stirred at room temperature for 3 hours, then at 50° for 30 minutes, then at 80° for 45 minutes. The resulting mixture is then subjected to vacuum for 45 minutes at 80°, and then left under vacuum at room temperature for 18 hours to remove volatile constituents. The resulting residue is distributed between 100 ml. of chloroform and 50 ml. of water. The organic phase is washed twice with water, dried over calcium chloride and then concentrated to obtain 3-trimethylsilylmethyl ether of estrone as an oily residue, which is refined by crystallizing twice from 95% ethanol; M.P. (130)–134–136°.

STEP B.—PREPARATION OF 3-TRIMETHYLSILYLMETH-YL ETHER OF 17ALPHA-ETHYNYLESTRA-1,3,5(10)-TRIENE-3,17BETA-DIOL

Under a nitrogen atmosphere 1.70 g. (18.45 mmoles) of lithium acetylide/ethylene diamine complex is combined with 10 ml. of absolute dimethyl sulfoxide. With stirring, a solution of 1.00 g. (2.8 mmoles) of 3-trimethylsilylmethyl ether or estrone (obtained as described in Step A, above) in 10 ml. of absolute dimethyl sulfoxide and 7 ml. of absolute tetrahydrofuran, is added thereto, and the resulting mixture stirred at room temperature for 4 hours.

The reaction mixture is then poured into about 100 g. of ice-water, 100 ml. of cold water is added, and the pH of the aqueous mixture is then adjusted to 7 with dilute hydrochloric acid. The neutralized aqueous mixture is then retracted with 50 ml. of diethyl ether. The ether solvent is then removed by evaporating under vacuum to obtain a sticky residue which forms a solid foam on further removal of volatiles. The foam is stirred at room temperature with 5 ml. of cyclohexane for two days to obtain 3-trimethylsilylmethyl ether of 17alpha-ethynylestra - 1,3,5 (10)-triene - 3,17beta-diol as crystals, M.P. (125)–127–128.5°

EXAMPLE 2

3-trimethylsilylmethyl ether of 17alpha-ethynylestra-1,3,5 (10)-triene-3, 17beta-diol (alternative procedure)

Carrying out the procedure described in Step A of Example 1 but replacing the estrone used therein with an equivalent amount of 17alpha-ethynylestra - 1,3,5(10)-triene-3,17beta-diol, i.e. 17-ethynyl estradiol, and the reaction mixture allowed to stand for 18 hours before volatiles are removed, there is obtained the 3-trimethylsilylmethyl ether of 17alpha-ethynylestra-1,3,5(10)-triene-3,17beta-diol.

Repeating the above-described procedure, but using in place of the 17-ethynyl estradiol, an equivalent amount of:

(a) equilenin,
(b) equilin,
(c) beta-estradiol,
(d) 17alpha-(2-butyn-1-yl)-13beta-methyl-B-homogona-1,3,5(10)-triene-3, 17beta-diol;
(e) 17alpha-ethylestra-1,3,5(10)-triene-3, 16alpha, 17beta-triol, and
(f) 17beta-methoxyestra-1,3,5(10)-trien-3-ol there is obtained:

(a) the 3-trimethylsilylmethyl ether of equilenin,
(b) the 3-trimethylsilylmethyl ether of equilin,
(c) the 3-trimethylsilylmethyl ether of beta-estradiol,
(d) the 3-trimethylsilylmethyl ether of 17alpha-(2-butyn-1-yl)-13beta-methyl-B-homogona-1,3,5(10)-triene-3, 17beta-diol,
(e) the 3-trimethylsilylmethyl ether of 17alpha-ethyl-estra-1,3,5(10)-triene-3, 16alpha,17beta-triol, and
(f) the 3-trimethylsilylmethyl ether of 17beta-methoxy-estra-1,3,5(10)-trien-3-ol

EXAMPLE 3

Following the procedure described in Step A of Example 1, but using in place of the estrone used therein, a molar equivalent amount of a steroidal compound having a plurality of hydroxy-groups, and using the sodium hydride, sodium iodide and chloromethyltrimethylsilane, in amounts which represent multiples of the amounts used therein; the multiple factor being the same as the number of hydroxy groups per molecule of the steroidal reactant desired to be reacted, and the step of stirring and heating of the reaction mixture at 80° is continued until a small sample after being worked up as in Example 1, Step A, fails to show any more hydroxyl group absorption in the infrared spectrum (2.5 to 3 microns), there is obtained the corresponding poly-(trimethylsilylmethyl) ether of the steroidal reactant; thus the steroidal compound;

(a) Beta-estradiol,
(b) 17alpha-ethynylestra-1,3,5(10)-triene 3, 16alpha, 17beta-triol, and
(c) 1,3,5(10)-estratriene-3,16alpha, 17beta-triol, yields the product;

(a) 3,17beta-di-(trimethylsilylmethyl) ether of beta-estradiol,
(b) 3,16alpha-di-(trimethylsilylmethyl) ether of 17alpha-ethynylestra-1,3,5(10)-triene-3,16alpha, 17beta-triol, and (c) tri-(trimethylsilylmethyl)-ether of 1,3,5(10)-estratriene-3,16alpha, 17beta-triol by use of the factor;

(a) 2,
(b) 2, and
(c) 3, respectively.

EXAMPLE 4

Carrying out the procedure described in Step A of Example 1 but replacing the estrone used therein with an equivalent amount of:

(a) 17-ethylenedioxyestra-1,3,5(10)-trien-3-ol and
(b) 13-n-propylgona-1,3,5(10)-trien-3-ol there is accordingly obtained:

(a) the 3-trimethylsilylmethyl ether of 17-ethylenedioxy-estra-1,3,5(10)-trien-3-ol, and
(b) the 3-trimethylsilylmethyl ether of 13-n-propylgona-1,3,5(10)-trien-3-ol.

EXAMPLE 5

Carrying out the procedure described in Step A of Example 1 but replacing the chloromethyltrimethylsilane used therein with an equivalent amount of:

(a) chloromethyltriethylsilane,
(b) bromomethyltrimethylsilane,
(c) iodomethyltrimethylsilane, and
(d) chloromethyldimethylethylsilane there is accordingly obtained:

(a) the 3-triethylsilylmethyl ether of estrone,
(b) and (c) the 3-trimethylsilylmethyl ether of estrone, and
(d) the 3-dimethylethylsilylmethyl ether of estrone.

What is claimed is:
1. A compound of the formula

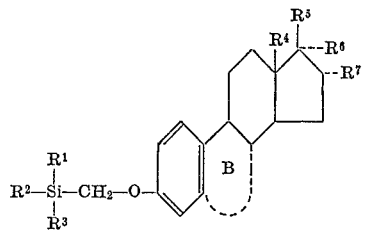

wherein
each of $R^1$, $R^2$ and $R^3$ is, independently, lower alkyl;
$R_4$ is alkyl having from 1 to 3 carbon atoms, each of $R^5$ and $R^7$ is, independently, a hydrogen atom, hydroxy, lower alkanoyloxy, benzoyloxy, tetrahydropyran-2-yloxy, or, any of the functions:

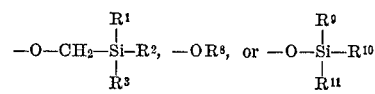

wherein
$R^1$, $R^2$ and $R^3$ are as defined above and $R^8$, $R^9$, $R^{10}$ and $R^{11}$ are each, independently, lower alkyl;
$R^6$ is lower alkanoyloxy, benzoyloxy, tetrahydropyran-2-yloxy, hydroxy, or, any of the functions:

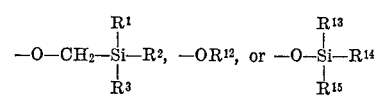

wherein
$R^1$, $R^2$ and $R^3$ are as defined above and $R^{12}$, $R^{13}$, $R^{14}$ and $R^{15}$ are each, independently, loweralkyl,
when $R^5$ is a hydrogen atom; and
when $R^5$ is other than a hydrogen atom, then $R^6$ is lower alkyl, alkenyl having from 2 to 4 carbon atoms, alkynyl having from 2 to 6 carbon atoms, propadienyl or 3'-lower alkylpropadienyl; a hydrogen atom; and $R^5$ and $R_6$ taken together are oxo, ethylenedioxy or n-propylenedioxy;

and ring B is saturated and contains from 6 to 7 carbon atoms, or is a mono or di-ethylenically unsaturated cyclic hydrocarbon ring containing 6 carbon atoms, said mono-unsaturation being at either the 6,7 or 8-positions, and said diunsaturation being at the 6 and 8 positions;

and the compound may have an 8(14) double bond when ring B has 7 carbon atoms, lower alkyl signifying alkyl having from 1 to 4 carbon atoms, and lower alkanoyl signifying alkanoyl having from 1 to 4 carbon atoms.

2. A compound of claim 1 wherein $R^5$ and $R^6$ together represent oxo.

3. A compound of claim 1 wherein $R^6$ is ethynyl.

4. A compound of claim 1 wherein ring B contains 6 carbon atoms.

5. A compound of claim 1 wherein ring B contains 7 carbon atoms.

6. A compound of claim 4 wherein $R^4$ is methyl.

7. The compound of claim 6 which is the 3-trimethylsilylmethyl-ether of 17alpha-ethynylestra-1,3,5(10)-triene-3,17beta-diol.

8. The compound of claim 6 which is the 3-trimethylsilylmethyl ether of estrone.

9. A process for the preparation of a compound of the formula

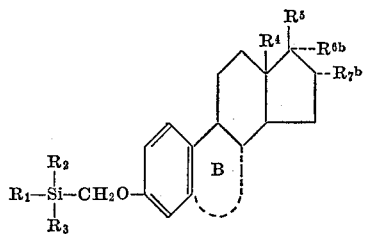

wherein each of $R^1$, $R^2$ and $R^3$ is, independently, lower alkyl; $R^4$ is alkyl having from 1 to 3 carbon atoms, each of $R^{5b}$ and $R^{7b}$ is, independently, a hydrogen atom, hydroxy, lower alkanoyloxy, benzoyloxy, tetrahydropyran-2-yloxy, or, any of the functions:

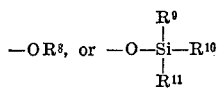

wherein $R^8$, $R^9$, $R^{10}$ and $R^{11}$ are each, independently, lower alkyl; $R^{6b}$ is lower alkanoyloxy, benzoyloxy, tetrahydropyran-2-yloxy, hydroxy, or any of the functions:

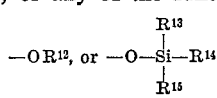

wherein $R^{12}$, $R^{13}$, $R^{14}$ and $R^{15}$ are each, independently, lower alkyl, when $R^{5b}$ is a hydrogen atom; and when $R^{5b}$ is other than a hydrogen atom, then $R^{6b}$ is lower alkyl, alkenyl having from 2 to 4 carbon atoms, alkynyl having from 2 to 6 carbon atoms, propadienyl or 3'-lower alkylpropadienyl; a hydrogen atom; or $R^{5b}$ and $R^{6b}$ taken together are oxo, ethylenedioxy or n-propylenedioxy;

and ring B is saturated and contains from 6 to 7 carbon atoms, or is a mono or di-ethylenically unsaturated cyclic hydrocarbon ring containing 6 carbon atoms, said mono-unsaturation being at either the 6, 7 or 8-positions, and said diunsaturation being at the 6 and 8 positions;

and the compound may have an 8(14) double bond when ring B has 7 carbon atoms, lower alkyl signifying alkyl having from 1 to 4 carbon atoms, and lower alkanoyl signifying alkanoyl having from 2 to 4 carbon atoms; which comprises reacting an alkali metal alcoholate of a hydroxy compound of the formula

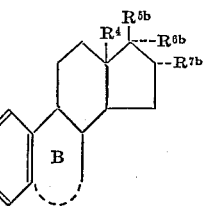

wherein each of ring B, $R^4$, $R^{5b}$, $R^{6b}$ and $R^{7b}$ is as defined above, with a trialkyl silyl methyl halide of the formula $$R^2-\underset{\underset{R^3}{|}}{\overset{\overset{R^1}{|}}{Si}}-CH_2-X$$

wherein each of $R^1$, $R^2$ and $R^3$ is as defined above, and

X is a halogen having an atomic weight of from 34 to 127, in an inert organic solvent at a temperature of from about $-20°$ to $+100°$ C.

10. A process for the preparation of a steroidal compound of the formula

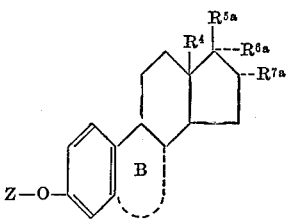

wherein Z is a trialkylsilylmethyl function of the formula $$R^2-\underset{\underset{R^3}{|}}{\overset{\overset{R^1}{|}}{Si}}-CH_2-$$

wherein each of $R^1$, $R^2$ and $R^3$ is, independently, lower alkyl;

$R^4$ is alkyl having from 1 to 3 carbon atoms, each of $R^{5a}$ and $R^{7a}$ is, independently, a hydrogen atom, hydroxy, lower alkanoyloxy, benzoyloxy, tetrahydropyran-2-yloxy, or, any of the functions:

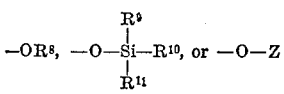

wherein

Z is as defined above and $R^8$, $R^9$, $R^{10}$ and $R^{11}$ are each, independently, lower alkyl;

$R^{6a}$ is lower alkanoyloxy, benzoyloxy, tetrahydropyran-2-yloxy, hydroxy or, any of the functions:

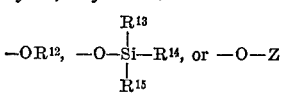

wherein

Z is as defined above and $R^{12}$, $R^{13}$, $R^{14}$ and $R^{15}$ are each, independently, lower alkyl, when $R^{5a}$ is a hydrogen atom; and when $R^{5a}$ is other than a hydrogen atom, then $R^{6a}$ is lower alkyl, alkenyl having from 2 to 4 carbon atoms, alkynyl having from 2 to 6 carbon atoms, propadienyl or 3'-lower alkylpropadienyl, a hydrogen atom; or $R^{5a}$ and $R^{6a}$ taken together are oxo, ethylenedioxy or n-propylenedioxy;

and ring B is saturated and contains from 6 to 7 carbon atoms, or is a mono or di-ethylenically unsaturated cyclic hydrocarbon ring containing 6 carbon atoms, said mono-unsaturation being at either the 6, 7 or 8-positions, and said di-unsaturation being at the 6 and 8 positions;

and the compound may have an 8(14) double bond when ring B has 7 carbon atoms, lower alkyl signifying alkyl having from 1 to 4 carbon atoms, and lower alkanoyl signifying alkanoyl having from 2 to 4 carbon atoms;

which comprises reacting under basic conditions an alkali metal alcoholate of a hydroxy compound of the formula

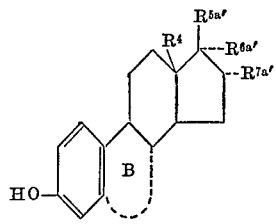

wherein
ring B and $R^4$ are as defined above and each of $R^{5a'}$, $R^{6a'}$, and $R^{7a'}$ is the same as $R^{5a}$, $R^{6a}$ and $R^{7a}$ as defined above respectively, except that they cannot be —O—Z with a trialkyl silyl methyl halide of the formula $$Z-X$$

wherein
Z is as defined above, and
X is a halogen having an atomic weight of from to 34 to 127, in an inert organic solvent at a temperature of from about —20° to +100° C.; the basic conditions being at least sufficient to maintain those hydroxy functions present on the hydroxy steroid, which are desired to be reacted, as their alkali metal salts, and provided that when $R^{7a}$ is not —O—Z then $R^{6a}$ is not —O—Z, and that the amount of the trialkylsilylmethyl halide is at least equivalent to the number of —O—Z units on the steroidal compound.

References Cited
UNITED STATES PATENTS 3,560,532  2/1971  Cereghetti et al. ____ 260—397.4

ELBERT L. ROBERTS, Primary Examiner

U.S. Cl. X.R.

260—611, 239.55 C, 239.55 R; 424—238